US010429573B2

(12) United States Patent
Park et al.

(10) Patent No.: US 10,429,573 B2
(45) Date of Patent: Oct. 1, 2019

(54) GLASSLESS THREE-DIMENSIONAL DISPLAY APPARATUS INCLUDING SINGLE BACKLIGHT UNIT

(71) Applicant: SAMSUNG ELECTRONICS CO., LTD., Suwon-si (KR)

(72) Inventors: Joonyong Park, Suwon-si (KR); Bongsu Shin, Seoul (KR); Dongouk Kim, Pyeongtaek-si (KR); Hyunjoon Kim, Seoul (KR); Jihyun Bae, Seoul (KR); Dongsik Shim, Hwaseong-si (KR); Sunghoon Lee, Seoul (KR); Jaeseung Chung, Suwon-si (KR); Seokho Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 40 days.

(21) Appl. No.: 15/404,553

(22) Filed: Jan. 12, 2017

(65) Prior Publication Data
US 2018/0059312 A1 Mar. 1, 2018

(30) Foreign Application Priority Data
Aug. 31, 2016 (KR) .................. 10-2016-0111760

(51) Int. Cl.
*F21V 8/00* (2006.01)
(52) U.S. Cl.
CPC ......... *G02B 6/0068* (2013.01); *G02B 6/0038* (2013.01)
(58) Field of Classification Search
None
See application file for complete search history.

(56) References Cited

U.S. PATENT DOCUMENTS

| 9,250,448 | B2 | 2/2016 | Robinson |
| 2012/0013651 | A1 | 1/2012 | Trayner et al. |
| 2014/0293759 | A1 | 10/2014 | Taff et al. |
| 2014/0300840 | A1 | 10/2014 | Fattal et al. |
| 2015/0085331 | A1 | 3/2015 | Chae |

FOREIGN PATENT DOCUMENTS

| JP | 2002189230 A | 7/2002 |
| KR | 1020110122815 A | 11/2011 |
| KR | 1020150033501 A | 4/2015 |

OTHER PUBLICATIONS

JP2002189230A Jul. 5, 2002 Matsushita Electric Ind Co Ltd—Machine translation (Year: 2002).*

(Continued)

*Primary Examiner* — Britt D Hanley
(74) *Attorney, Agent, or Firm* — Sughrue Mion, PLLC

(57) ABSTRACT

A double-sided glassless three-dimensional (3D) display apparatus including a backlight unit may include an light source unit configured to emit light to the front and the rear thereof by diffracting incident light, and first and second display devices configured to use the light emitted by the light source unit as light for a 3D image formation and to form the 3D image on both sides of the light source unit. The light source unit may include a light source portion configured to emit three lights that have three different respective wavelengths and a light guide panel configured to transmit the lights emitted by the light source portion to the first and second display devices.

21 Claims, 8 Drawing Sheets

(56) References Cited

OTHER PUBLICATIONS

David Fattal et al., "A multi-directional backlight for a wide-angle, glasses-free three-dimensional display", Nature, vol. 495, Mar. 21, 2013, pp. 348-351, doi:10.1038/nature11972.
"Guided Light Input Allows for Wide-Angle, Full Parallax, Ghost Free 3D Images", Total 10 pages, Mar. 21, 2013, doi:10/1038/nature11972.

* cited by examiner

GLASSLESS THREE-DIMENSIONAL DISPLAY APPARATUS INCLUDING SINGLE BACKLIGHT UNIT

CROSS-REFERENCE TO RELATED APPLICATION

This application claims priority from Korean Patent Application No. 10-2016-0111760, filed on Aug. 31, 2016, in the Korean Intellectual Property Office, the disclosure of which is incorporated herein by reference in its entirety.

BACKGROUND

1. Field

Exemplary embodiments relate to an image display apparatus, and more particularly, to a three-dimensional display apparatus including a single backlight unit.

2. Description of the Related Art

A three-dimensional (3D) display is a display apparatus providing a 3D image.

The 3D display at the initial stage is a glass-type 3D display which requires separate glasses for viewing a 3D image. A principle of viewing the 3D image via the glass-type 3D display is as follows. In particular, images corresponding to the left eye and the right eye are generated in the 3D display, and parallax of the images perceived by the left and right eyes which results from switching of glasses or polarization is recognized as the 3D image.

For a purpose of removing the inconvenience in wearing glasses, research has been actively performed to develop a glassless 3D display that permits a viewer to visually see the 3D image without glasses. In the case of the glassless 3D display under development, the image of respective views displayed on a screen may be distributed in a viewing space by using a lenticular lens, a parallax barrier layer, or a liquid crystal lens. The left and right eyes of the viewer may recognize respective views having a certain amount of parallax as the 3D image. In the case of the glassless 3D display, cross-talk may increase and the quality of two-dimensional (2D) image may decrease.

Recently, a 3D display employing a light guide panel (LGP), with a grating, which can implement low cross-talk at multi-viewpoints has been introduced. In this case, because cross-talk is lower than that of the glassless 3D display using the lenticular lens, a 3D image providing a sufficient level of depth sense may be realized.

SUMMARY

Provided is a glassless three-dimensional (3D) display apparatus which may have at least a relatively low amount of cross-talk, simultaneously provide a 3D image in directions that are different from each other, and include a single backlight unit.

Additional aspects will be set forth in part in the description which follows and, in part, will be apparent from the description, or may be learned by practice of the presented exemplary embodiments.

According to an aspect of an exemplary embodiment, the glassless 3D display apparatus including a backlight unit may include a light source unit configured to emit light in two directions that are different from each other by diffracting an incident light, and first and second display devices configured to use light emitted from the light source unit as light for formation of a 3D image and form the 3D image on both sides of the light source unit.

In the glassless 3D display apparatus, the first and second display devices may be disposed in the front and the rear of the light source unit, respectively.

The light source unit may include a grating.

The light source unit may include a single backlight unit that includes a diffraction portion.

The light source unit may include a light guide panel (LGP).

The light source unit may include light source portions configured to emit three lights having respective wavelengths that are different from each other and the LGP which is configured to facilitate a propagation of light emitted from the light source portions to the first and second display devices.

The first and second display devices may be the same or different from each other.

The first and second display devices may include a liquid crystal display (LCD) apparatus or an organic light-emitting diode (OLED) apparatus.

The light source unit may further include an optical transmission medium disposed between the light source portions and the LGP.

The light source portions may include a first light source portion configured to emit red color light, a second light source portion configured to emit green color light, and a third light source portion configured to emit blue color light.

The light source portions may be disposed on side surfaces of the LGP.

The LGP may include the diffraction portion which includes a plurality of unit diffraction areas, and the plurality of unit diffraction areas may correspond to a first plurality of pixels included in a pixel area of the first display device, and the plurality of unit diffraction areas may correspond to a second plurality of pixels included in a pixel area of the second display device.

Each of the plurality of unit diffraction areas may include a first sub-diffraction area, a second sub-diffraction area, and a third diffraction area, and the each of the first, second, and third sub-diffraction areas may include grating slits arranged in directions which are different from each other.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
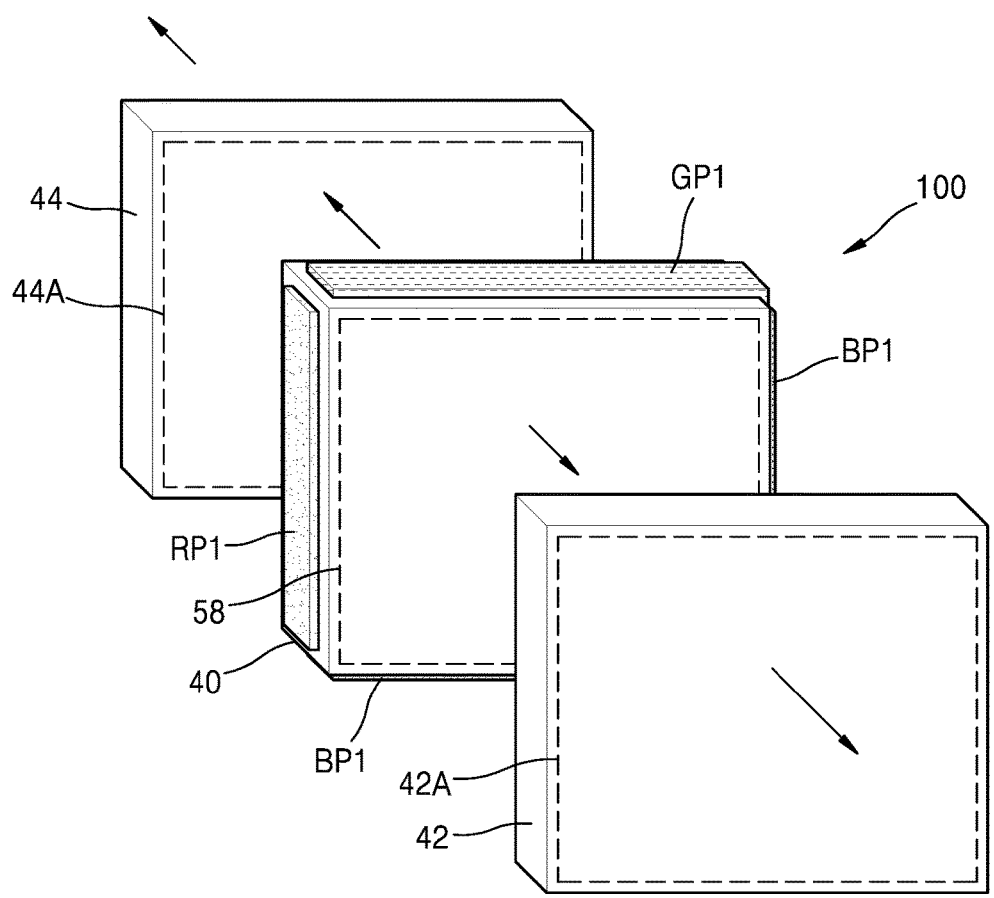
FIG. 1 is a three-dimensional (3D) view of a glassless 3D display apparatus which includes a single backlight unit, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

A double-sided display may be used in various areas such as a signage, a wall television (TV), and a counter monitor, and provide a three-dimensional (3D) image to both sides thereof. For providing the 3D image via the double-sided display, development of a double-sided glassless 3D display apparatus may be required. According to an exemplary embodiment, a glassless 3D display apparatus will be described which can provide the 3D image to both sides of a light guide panel (LGP) by using the LGP which includes a grating.

Below, the glassless 3D display apparatus which includes a single backlight unit will be described in detail with reference to attached drawings, according to an exemplary embodiment. Thicknesses of layers or areas illustrated in the drawings may be exaggerated for clarity of the specification.

FIG. 1 is a 3D view of the glassless 3D display apparatus which includes a single backlight unit, according to an exemplary embodiment.

Referring to FIG. 1, the glassless 3D display apparatus according to an exemplary embodiment may include a single backlight unit (also referred to herein as a "backlight device") 100, a first display device 42, and a second display device 44. The single backlight unit 100 may denote a light source unit. The first and second display devices 42 and 44 may be same (i.e., of a same type) or different from each other.

The single backlight unit 100 may include an LGP 40, a first light source portion RP1, a second light source portion GP1, and a third light source portion BP1. The first light source portion RP1 may be disposed on a first side surface among side surfaces of the LGP 40, such as, for example, on a left side surface. The first light source portion RP1 may include a plurality of first light sources. The plurality of first light sources may be arranged in an array. The first light source may include a light source that emits, for example, red color light. The first light source may include, for example, a light-emitting diode (LED). However, the exemplary embodiment is not limited thereto. The second light source portion GP1 may be disposed on an adjacent second surface and/or third side surface among the side surfaces of the LGP 40, such as, for example, on a top side surface and a right side surface. The second light source portion GP1 may include a plurality of second light sources. The plurality of second light sources may be arranged in an array. The second light source may include a light source that emits, for example, green color light. The second light source may include an LED. However, the exemplary embodiment is not limited thereto. The third light source portion BP1 may be disposed on two adjacent side surfaces among the side surfaces of the LGP 40. For example, the third light source portion BP1 may be disposed on the third side surface and a fourth side surface (e.g., the right side surface and a bottom side surface). Two light source portions, such as, for example, the second and third light source portions GP1 and BP1, may be disposed together on a portion of the side surfaces (for example, the right side surface) of the LGP 40. However, each light source portion may be in contact with each other or be disposed without contact in the described-above arrangement. The third light source portion BP1 may include a plurality of third light sources. The plurality of third light sources may be arranged in an array. For example, the third light source may be an LED that emits blue color light. However, the exemplary embodiment is not limited thereto.

Light that propagates toward the inside of the LGP 40 from the first, second, and third light source portions RP1, GP1, and BP1 of the single backlight unit 100 may be incident on a diffraction portion 58 of the LGP 40, either directly or via internal total reflection. Light incident on the diffraction portion 58 of the LGP 40 may be diffracted. As a result, light emitted toward the front of the diffraction portion 58 and light emitted toward the rear of the diffraction portion 58 (reflected light) may be generated. A detailed description on this phenomenon will be provided below. The light emitted toward the front of the diffraction portion 58 may be incident on a pixel area 42A of the first display device 42 and used for displaying a 3D image. The light emitted toward the rear of the diffraction portion 58 may be incident on a pixel area 44A of the second display device 44 and used for displaying a 3D image. Accordingly, the 3D image may be simultaneously provided in two directions which are different from each other. The respective pixel areas 42A and 44A of the first and second display devices 42 and 44 may respectively correspond to the diffraction portion 58 of the LGP 40.

The first display device 42 may be disposed on one side, such as, for example, in the front of the single backlight unit 100. The second display device 44 may be disposed on another side, such as, for example, in the rear of the single backlight unit 100. The first and second display devices 42 and 44 may include flat displays. For example, each of the first and second display devices 42 and 44 may include any one of a thin film transistor-liquid crystal display (TFT-LCD), an organic light-emitting diode (OLED) display, etc. The first and second display devices 42 and 44 may be closely adhered to the single backlight unit 100.

In another exemplary embodiment, a three-dimensional (3D) display apparatus is provided. The 3D display apparatus includes a light source configured to emit light, a light guide panel (LGP) configured to receive the emitted light and to diffract the received light such that a first portion of the diffracted light propagates in a first direction and a second portion of the diffracted light propagates in a second direction which is different from the first direction, a first display device configured to use the first portion of the diffracted light for formation of a 3D image, and a second display device configured to use the second portion of the diffracted light for formation of the 3D image.

Figure 2:
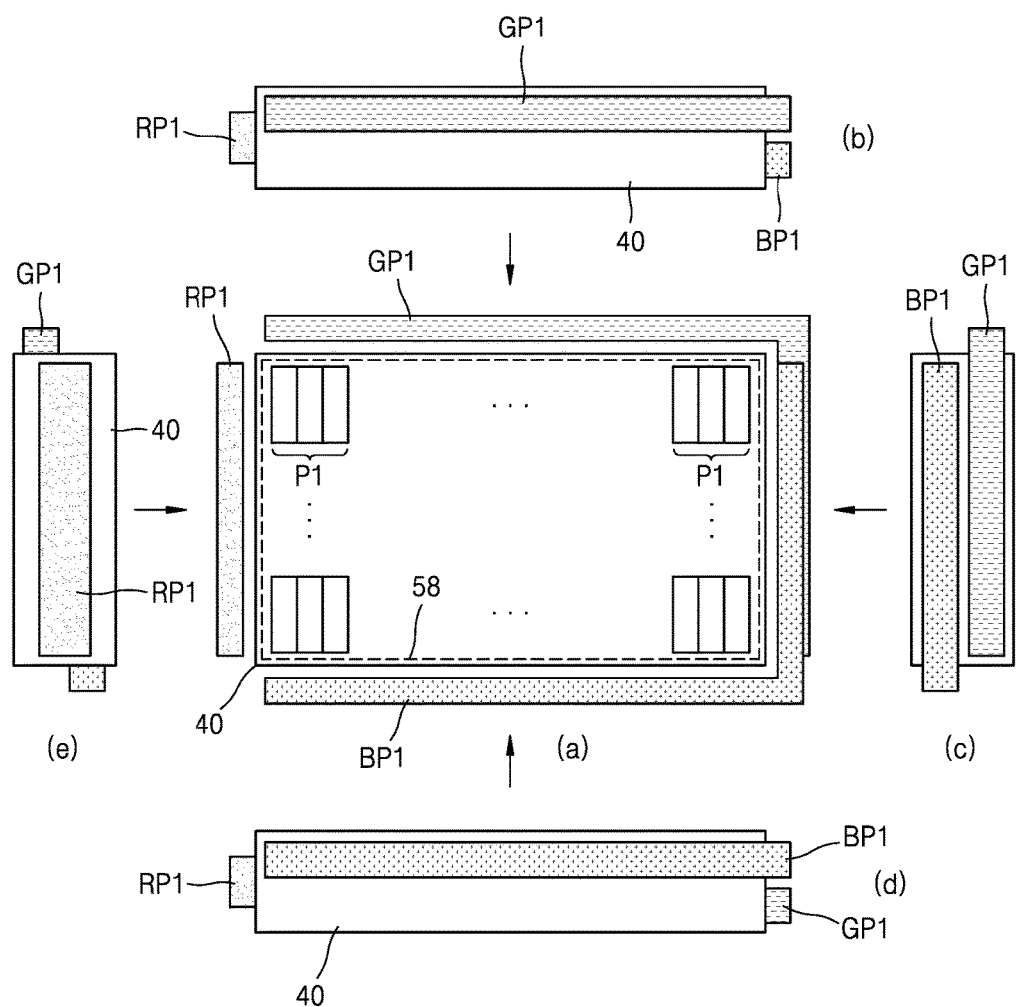
FIG. 2 illustrates a front view (a), a planar view (b), a right side view (c), a bottom side view (d), and a left side view (e) of a light guide panel (LGP) included in the glassless 3D display apparatus of FIG. 1.

FIG. 2 illustrates a front view (a) and various side views (b), (c), (d), and (e) of the LGP 40 of the double-sided glassless 3D display apparatus. In FIG. 2, the view (b) is a top side view of the view (a), the view (c) is a right side view of the view (a), the view (d) is a bottom side view of the view (a), and the view (e) is a left side view of the view (a).

In FIG. 2, the LGP 40 and the first, second, and third light source portions RP1, GP1, and BP1 are illustrated as being separate from each other for the sake of convenience; however, the LGP 40 and the first, second, and third light source portions RP1, GP1, and BP1 may be closely adhered to each other or directly in contact with each other. A light transmission medium may be further included between the first, second, and third light source portions RP1, GP1, and BP1, and the LGP 40. In this case, light emitted from the first, second, and third light source portions RP1, GP1, and BP1 may propagate to the LGP 40 via the light transmission medium. The plurality of light sources included in each of the first, second, and third light source portions RP1, GP1, and BP1 may emit directional light.

Referring to FIG. 2, the first light source portion RP1 may be located on the left side surface of the LGP 40, and the second light source portion GP1 may be located on the top side surface and extend to the right side surface. The third light source portion BP1 may be located on the bottom side surface of the LGP 40 and extend to the right side surface. Referring to the right side surface view (c) of the LGP 40, a portion of the second light source portion GP1 and a portion of the third light source portion BP1 may be co-located on the right side surface of the LGP 40, but both portions may be separate from each other.

In the front view (a) in FIG. 2, a width of a portion of the second light source portion GP1, which extends to the right side surface of the LGP 40, is illustrated as being greater than that of the third light source portion BP1; however, this illustration is provided to show the second light source portion GP1 behind the third light source portion BP1 on the right side surface on the drawing for the sake of convenience. Thus, the widths of the second and third light source portions GP1 and BP1, extending to the right side surface of the LGP 40, may be the same.

The diffraction portion 58 of the LGP 40 may include a plurality of first unit diffraction areas P1. The plurality of first unit diffraction areas P1 may be arranged in an array. The plurality of first unit diffraction areas P1 may correspond to a respective plurality of pixels included in each of the pixel areas 42A and 44A of the first and second display devices 42 and 44. Each of the first unit diffraction areas P1 may correspond to one pixel. The one pixel may include three sub-pixels, that is, a red color sub-pixel R, a green color sub-pixel G, and a blue color sub-pixel B. The first unit diffraction area P1 may include three sub-areas. The three sub-areas of the first unit diffraction area P1 may respectively correspond to three sub-pixels included in the one pixel.

The first, second, and third light source portions RP1, GP1, and BP1 may be disposed on the periphery of the LGP 40 in consideration of light emitted from respective first, second, and third light source portions RP1, GP1, and BP1 and orientation angles of diffraction slits formed in the first unit diffraction area P1. Accordingly, a disposition of the first, second, and third light source portions RP1, GP1, and BP1 on the periphery of the LGP 40 may be different from that illustrated in FIG. 2. For example, the disposition of the first, second, and third light source portions RP1, GP1, and BP1 illustrated in FIG. 2 may be modified as shown in FIG. 6.

Figure 6:
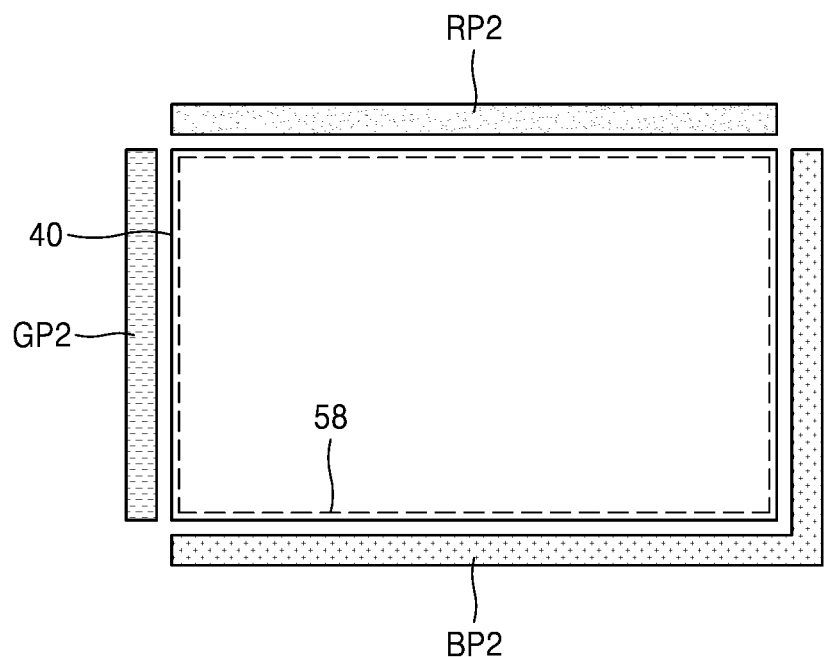
FIG. 6 is a front view illustrating a case in which a disposition of light source portions on the periphery of the LGP of the glassless 3D display apparatus is different from that in FIG. 2, according to an exemplary embodiment.

Referring to FIG. 6, a fourth light source portion RP2 may be disposed on the top side surface of the LGP 40. The fourth light source portion RP2 may include the same light source portion as the first light source portion RP1. A fifth light source portion GP2 may be disposed on the left side surface of the LGP 40. The fifth light source portion GP2 may include the same light source portion as the second light source portion GP1. A sixth light source portion BP2 may be disposed on the bottom side surface and the right side surface of the LGP 40. The sixth light source portion BP2 may include the same light source portion as the third light source portion BP1.

Figure 3:
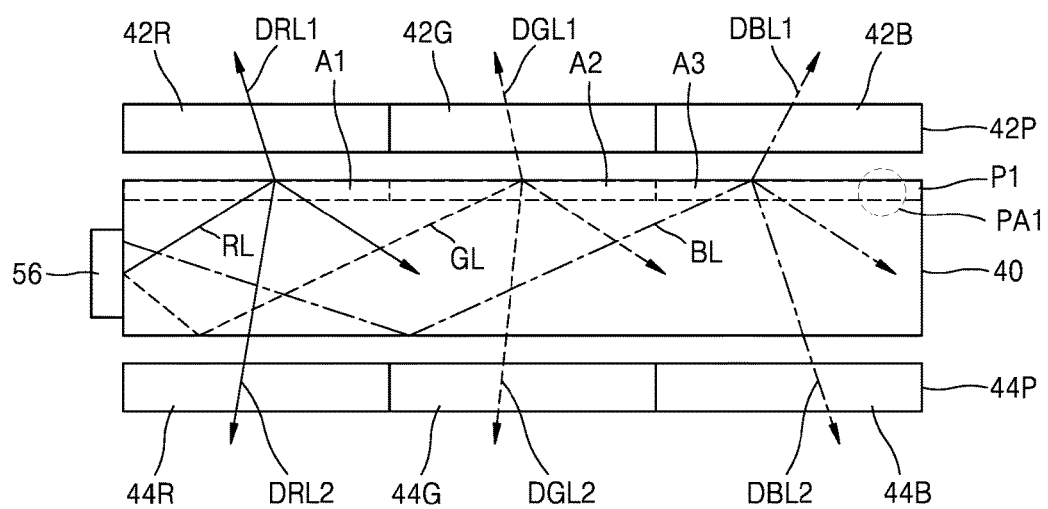
FIG. 3 is a cross-sectional view illustrating a process by which light is transmitted from the single backlight unit to each display in FIG. 1.

FIG. 3 illustrates a process by which light is transmitted from the single backlight unit in FIG. 1 to each display apparatus. The process may be applicable to the single backlight unit and all of the display apparatuses.

In FIG. 3, a light source 56 may denote any one of light sources included in the first, second, and third light source portions RP1, GP1, and BP1.

In FIG. 3, a solid line RL may denote a case in which the light source 56 is a light source that emits a red color light, a dashed line GL may denote a case in which the light source 56 is a light source that emits a green color light, and a long dashed short dashed line BL may denote a case in which the light source 56 is a light source that emits a blue color light BL. Depending on a characteristic of the light source 56, for example, a type of light emitted from the light source 56, a disposition and a disposition type of the light source 56 on the periphery of the LGP 40 may vary as described above. For example, the disposition and the disposition type of the light source 56 may be ones such that certain light (for example, red color light, green color light, or blue color light) emitted from the light source 56 is perpendicularly incident on the diffraction slits formed in an area of the diffraction portion 58 on which the certain light is incident. Thus, the disposition and the disposition type of the light source 56 are not limited to the exemplary embodiment illustrated in FIG. 3.

The red, green, and blue color lights RL, GL, and BL emitted by the light source 56 may be diffracted in the first unit diffraction area P1 of the diffraction portion 58, which is disposed on a light emitting surface of the LGP 40. In this case, 1st-order diffraction lights DRL1, DGL1, and DBL1 among light diffracted toward the front side of the LGP 40, may be incident on a first pixel 42P disposed on the front side of the LGP 40. The first pixel 42P may be one of the plurality of pixels included in the pixel area 42A of the first display device 42. −1st-order diffraction lights among light diffracted toward the rear of the LGP 40 in the first unit diffraction area P1, that is, reflected lights DRL2, DGL2, and DBL2 which have been reflected toward the rear of the LGP 40, may be incident on a second pixel 44P which is disposed in the rear of the LGP 40 and opposite to the first pixel 42P. The second pixel 44P may be one of a plurality of pixels included in the pixel area 44A of the second display device 44. The red, green, and blue lights RL, GL, and BL emitted from the light source 56 may be incident on the first unit diffraction area P1 either directly or via the total reflection inside the LGP 40. Light incident on the first unit diffraction area P1 may be diffracted, and as a result, the transmitted lights DRL1, DGL1, and DBL1 that have propagated toward the front of the LGP 40 and the reflected lights DRL2, DGL2, and DBL2 that have propagated toward the rear of the LGP 40 may be generated. All other diffracted light may not be incident on corresponding pixels.

Among the −1st-order diffraction lights DRL1, DGL1, and DBL1, which have propagated toward the front of the first unit diffraction area P1, the red color light DRL1 may be incident on a red color area 42R of the first pixel 42P, the green color light DGL1 may be incident on a green color area 42G of the first pixel 42P, and the blue color light DBL1 may be incident on a blue color area 42B of the first pixel 42P. In addition, among the −1st-order diffraction lights DRL2, DGL2, and DBL2, which have propagated toward the rear of the first unit diffraction area P1, the red color light DRL2 may be incident on a red color area 44R of the second pixel 44P, the green color light DGL2 may be incident on a green color area 44G, and the blue color light DBL2 may be incident on a blue color area 44B of the second pixel 44P.

As described above, light may be incident on the pixel areas 42A and 44A of the first and second display devices 42 and 44 from the LGP 40 of the single backlight unit. Accordingly, when a three-dimensionally rendered image signal may be provided to the first and second display devices 42 and 44, a 3D image which is visible to the naked eye may be formed on front sides of the first and second display devices 42 and 44. Thus, more users may simultaneously view a 3D image. In addition, since the LGP 40 is used, the level of cross-talk may be sufficiently low and a 3D image with sufficient depth may be viewed.

In FIG. 3, the sub-pixel areas of the first pixel 42P, that is, the red, green, and blue color areas 42R, 42G, and 42B, may respectively face and correspond to the sub-pixel areas of the second pixel 44P, that is, the red, green, and blue color areas 44R, 44G, and 44B. The first, second, and third sub-diffraction areas A1, A2, and A3 of the first unit diffraction area P1 may respectively correspond to the sub-pixel areas of the first pixel 42P. The first, second, and third sub-diffraction areas A1, A2, and A3 of the first unit diffraction area P1 may also respectively correspond to the sub-pixel areas of the second pixel 44P.

Only light diffracted in the first unit diffraction area P1 with a certain order (for example, the −1st-order transmitted and reflected diffraction light) may be incident on the first and second pixels 42P and 44P that correspond to the first unit diffraction area P1, by controlling a pitch of the grating included in the first unit diffraction area P1, the orientation angle of incident light on the grating, an incident angle of the incident light on the first unit diffraction area P1, etc. As an example, changes in a diffraction angle due to a pitch control of the grating will be described below with reference to FIGS. 7, 8, 9, and 10.

Figure 4:
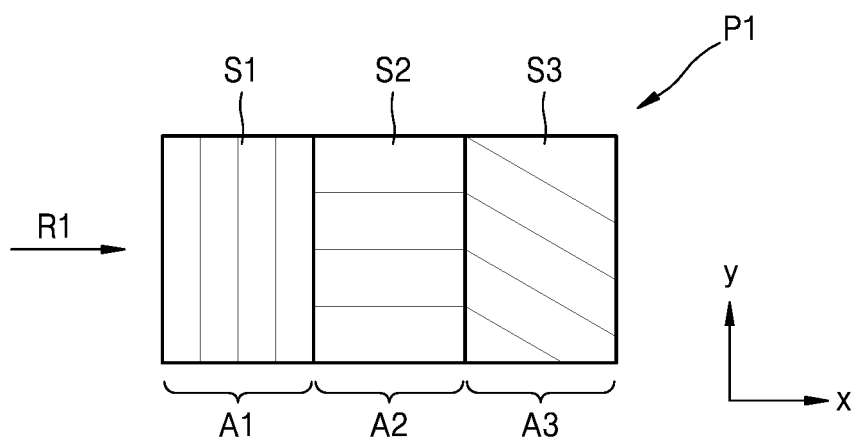
FIG. 4 is a planar view of slit directions of a grating formed in sub-diffraction areas included in a first unit diffraction area of the LGP.

FIG. 4 illustrates slit directions of the grating which is formed in the first, second, and third sub-diffraction areas A1, A2, and A3 included in the first unit diffraction area P1 of the LGP 40.

Referring to FIG. 4, first, second, and third grating slits S1, S2, and S3, which are respectively formed in the first, second, and third sub-diffraction areas A1, A2, and A3 of the first unit diffraction area P1, may have arrangement directions which are different from each other.

The first grating slit S1 in the first sub-diffraction area A1 may be arranged in an x-direction. The second grating slit S2 in the second sub-diffraction area A2 may be arranged in a y-direction. The third grating slit S3 in the third sub-diffraction area A3 may be arranged in a direction that is inclined with respect to each of the x-direction and the y-direction.

Since the arrangement directions of the first, second, and third grating slits S1, S2, and S3 of the first, second, and third sub-diffraction areas A1, A2, and A3 are different from each other, each of the first, second, and third sub-diffraction areas A1, A2, and A3 may respond to (or diffract) incident lights, which are perpendicular to each of the first, second, and third grating slits S1, S2, and S3 (that is, the incident lights having a zero orientation angle with respect to each grating). In particular, the first sub-diffraction area A1 may diffract the incident red color light R1 perpendicular to the first grating slit S1, as illustrated in FIG. 3, and the first grating slit S1 may not cause diffraction, as illustrated in FIG. 3, to light, for example, green and blue color lights, which are incident from other directions. This description may equally apply to the second and third sub-diffraction areas A2 and A3.

Accordingly, the disposition of the first, second, and third light source portions RP1, GP1, and BP1 on the periphery of the LGP 40 that includes the diffraction portion 58 may vary based on the arrangement directions of the first, second, and third grating slits S1, S2, and S3 formed in the first, second, and third sub-diffraction areas A1, A2, and A3 of the first unit diffraction area P1.

Figure 5:
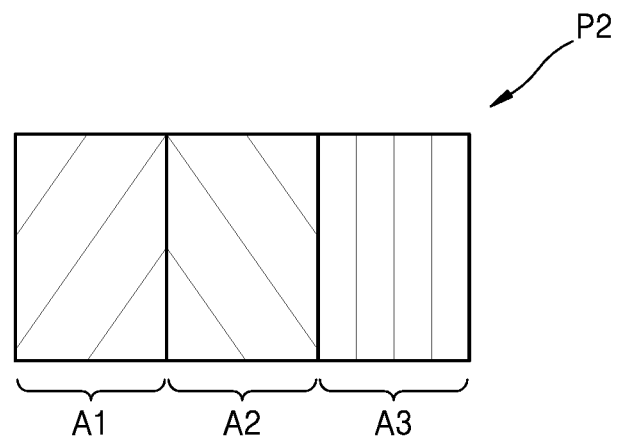
FIG. 5 is a planar view of a modified example of the first unit diffraction area of FIG. 4.

FIG. 5 illustrates a case in which arrangement directions of the first, second, and third grating slits S1, S2, and S3 formed in the first, second, and third sub-diffraction areas A1, A2, and A3 are different from those illustrated in FIG. 4.

Referring to FIG. 5, grating slits formed in the first sub-diffraction area A1 of a second unit diffraction area P2 may be inclined at a positive slope. Thus, the arrangement direction (i.e., a direction which is perpendicular to the corresponding slits) may be inclined to with respect to a −x direction and the +y direction. Grating slits formed in the second sub-diffraction area A2 may be inclined at a negative slope, and thus, the arrangement direction thereof may be inclined with respect to the +x direction and the +y direction. Grating slits formed in the third sub-diffraction area A3 may be arranged in the x direction.

Since the arrangement directions of the grating slits formed in the sub-diffraction areas A1, A2, and A3 included in the second unit diffraction area P2 of FIG. 5 are different from those of the first, second, and third grating slits S1, S2, and S3 formed in the first unit diffraction area P1 illustrated in FIG. 4, incidence directions of light incident on the first, second, and third sub-diffraction areas A1, A2, and A3 of the second unit diffraction area P2, that is, the orientation angles, may be different from those in FIG. 4, for generating diffraction in the second diffraction area P2 of FIG. 5.

Figure 7:
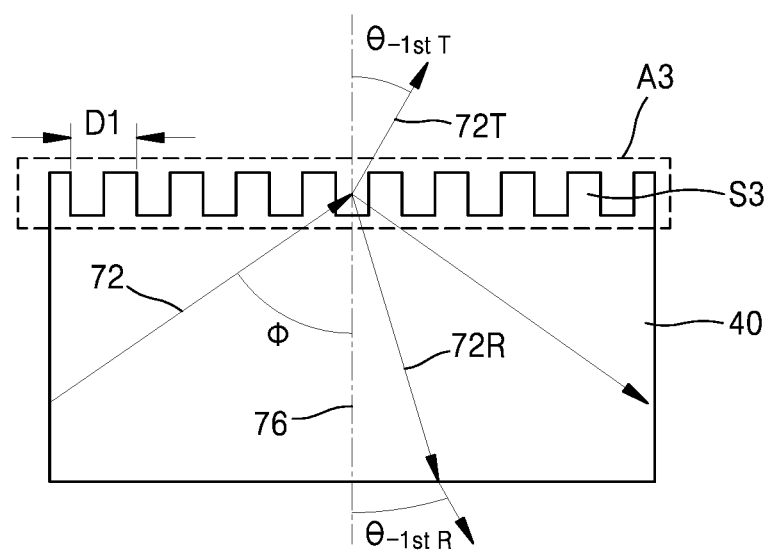
FIG. 7 is an enlarged view of a portion of the LGP including the first unit diffraction area in FIG. 3.

FIG. 7 is an enlarged view of a portion of the LGP 40 which includes the first unit diffraction area P1 illustrated in FIG. 3.

Referring to FIG. 7, the third grating slits S3 may be formed in the third sub-diffraction area A3 on a top side surface of the LGP 40. The third grating slits S3 may be separate from each other with a certain pitch D1. Heights of the third grating slits S3 may be the same.

Incident light 72 on the third sub-diffraction area A3 may be diffracted and as a result, a transmitted light, that is, a −1st-order transmitted diffraction light 72T emitted toward the front of the LGP 40, and a reflected light, that is, a −1st-order reflected diffraction light 72R emitted toward the rear of the LGP 40, may be generated. The incident light 72 on the third sub-diffraction area A3 may have a certain incident angle φ with respect to an incident plane 76 which is perpendicular to the longitudinal axis of the third sub-diffraction area A3. In addition, the light 72T emitted toward the front of the LGP 40 may proceed with a certain transmitted diffraction angle $\theta_{-1stT}$ with respect to the incident plane 76 and the light 72R emitted toward the rear of the LGP 40 may proceed with a certain reflected diffraction angle $\theta_{-1stR}$ with respect to the incident plane 76. The transmitted diffraction angle $\theta_{-1stT}$ and the reflected diffraction angle $\theta_{-1stR}$ may vary based on the incident angle φ or the pitch D1 of the third grating slit S3.

A viewing angle of a 3D display apparatus which employs the first and second display devices 42 and 44 may vary in conjunction with the transmitted diffraction angle $\theta_{-1stT}$ and the reflected diffraction angle $\theta_{-1stR}$. In particular, the viewing angle may increase or decrease based on an increase or a decrease in the transmitted diffraction angle $\theta_{-1stT}$ and the reflected diffraction angle $\theta_{-1stR}$.

Next, changes in the transmitted diffraction angle $\theta_{-1stT}$ and the reflected diffraction angle $\theta_{-1stR}$ subject to a change in the pitch D1 of the third grating slit S3 will be analyzed via a simulation. For the simulation, the orientation angles of the light incident on respective first, second, and third sub-diffraction areas A1, A2, and A3 of the first unit diffraction area P1 were set to about 0° and the incident angles φ of light were set to about 55°.

Figure 8:
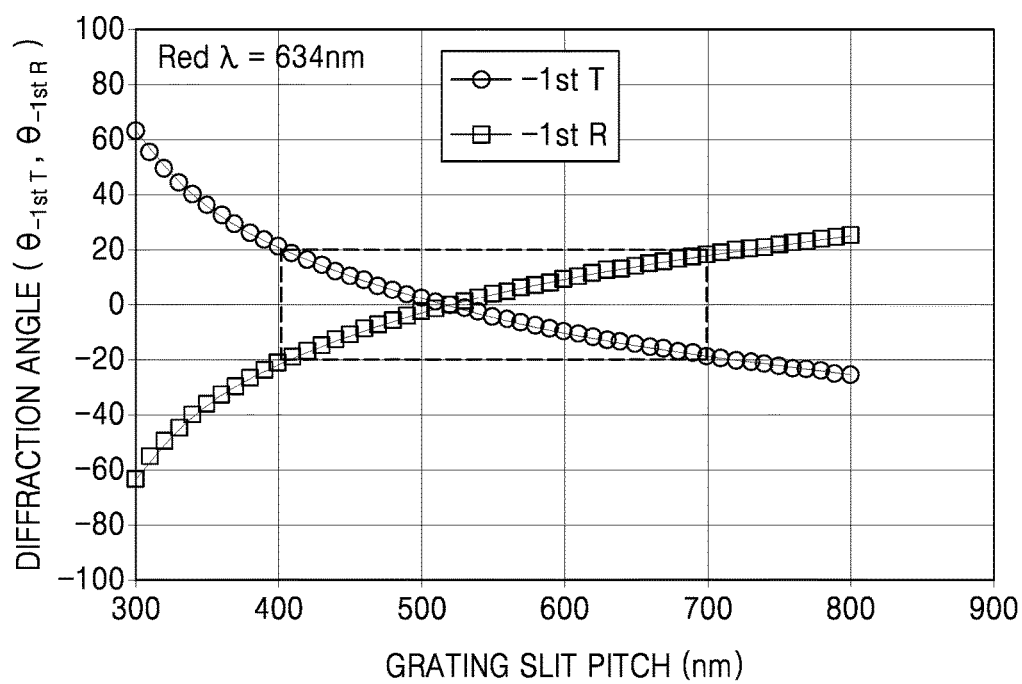
FIGS. 8, 9, and 10 are graphs illustrating a simulation result of changes in a transmitted diffraction angle and a reflected diffraction angle with respect to grating slit pitch of a glassless 3D display apparatus, according to an exemplary embodiment.
Figure 9:
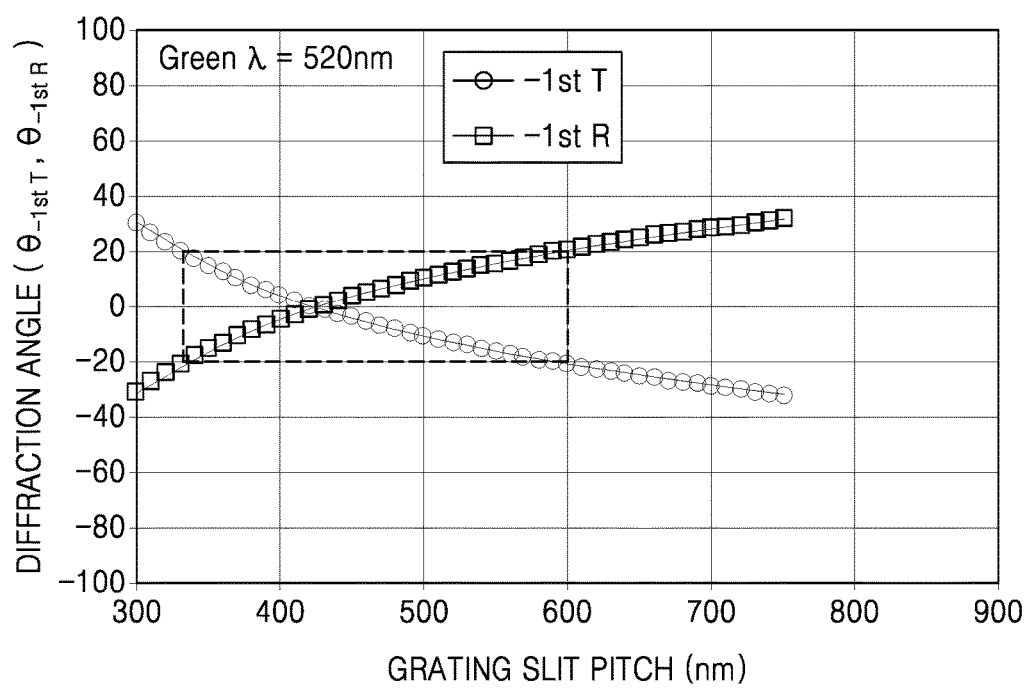
Figure 10:
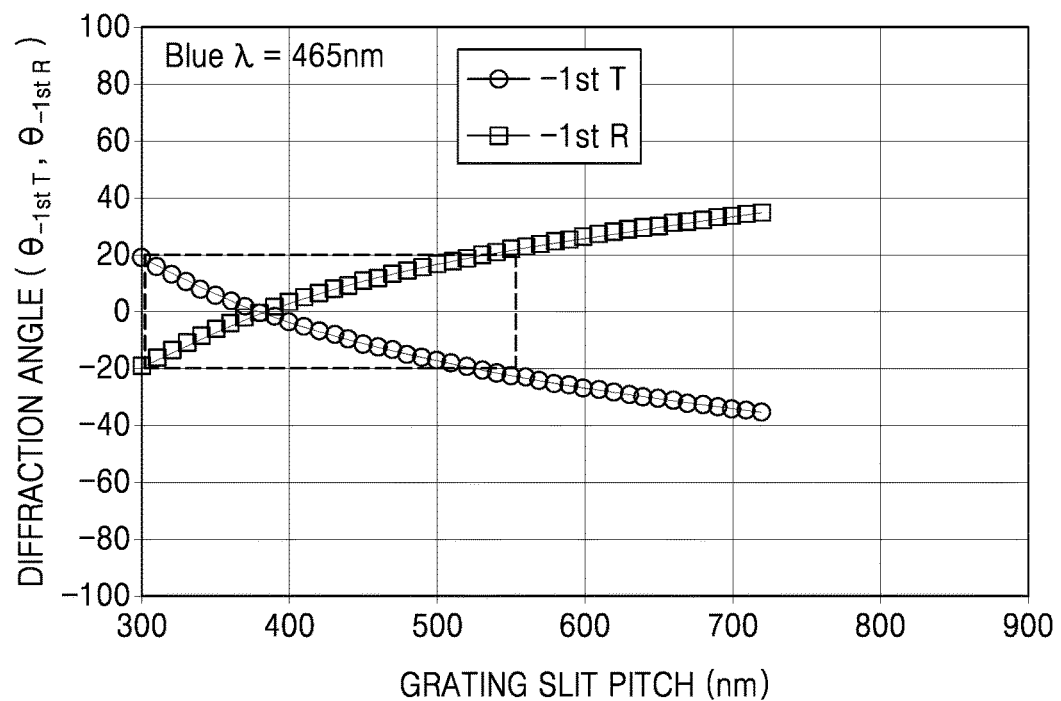

FIGS. 8, 9, and 10 illustrate results of the simulation for cases where the incident light 72 is a red color light (i.e., wavelength λ=634 nm), a green color light (i.e., wavelength λ=520 nm), and a blue color light (i.e., wavelength λ=465 nm), respectively. In each drawing, a horizontal axis denotes the pitch of the third grating slit S3 and a vertical axis denotes the diffraction angle of the third grating slit S3, that is, the transmitted diffraction angle $\theta_{-1stT}$ and the reflected diffraction angle $\theta_{-1stR}$.

In each drawing, a graph indicated by symbol ○ may denote changes in the transmitted diffraction angle $\theta_{-1stT}$ in accordance with changes in the pitch D1 of the third grating slit S3, and a graph indicated by symbol □ may denote changes in the reflected diffraction angle $\theta_{-1stR}$ in accordance with changes in the pitch D1 of the third grating slit S3.

Referring to FIGS. 8, 9, and 10, when the pitch D1 of the third grating slit S3 is controlled such that the transmitted diffraction angle $\theta_{-1stT}$ of the light emitted toward the front of the LGP 40 is within a range of about −20° to about 20°, the reflected diffraction angle $\theta_{-1stR}$ of the light emitted toward the rear of the LGP 40 is also controlled within a range of about −20° to about 20°. Due to these results, the 3D image may be visually viewed via the display apparatuses 42 and 44 disposed in the front and the rear of the LGP 40. In this manner, the double-sided glassless 3D display apparatus which respectively provide the 3D image to the front and the rear of the LGP 40 may be realized.

In the glassless 3D display apparatus described above, a hologram layer which is manufactured to serve the same function as the grating, instead of the grating, may be disposed in the diffraction area 58 of the LGP 40. The hologram layer may be disposed on the top side surface of the LGP 40.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A double-sided glassless three-dimensional (3D) display apparatus, the apparatus comprising:
   a light source configured to emit light in each of a first direction to exit through a first side of the light source and a second direction to exit through a second side of the light source which is different from the first side of the light source by diffracting incident light;
   a first display device configured to use the light emitted in the first direction for formation of a 3D image; and
   a second display device configured to use the light emitted in the second direction for formation of the 3D image.

2. The apparatus of claim 1, wherein the first display device is disposed in a front of the light source.

3. The apparatus of claim 1, wherein the light source comprises a grating.

4. The apparatus of claim 1, wherein the light source comprises a backlight device comprising a diffraction portion.

5. The apparatus of claim 1, wherein the light source comprises a light guide panel (LGP).

6. The apparatus of claim 1, wherein the light source comprises:
   a light source portion configured to emit a first light that has a first wavelength, a second light that has a second wavelength that is different from the first wavelength, and a third light that has a third wavelength that is different from the first wavelength and the second wavelength; and
   a light guide panel (LGP) configured to facilitate a propagation of light emitted from the light source portion to the first and second display devices.

7. The apparatus of claim 1, wherein the first display device is a same type of device as the second display device.

8. The apparatus of claim 1, wherein the first display device is a different type of device from the second display device.

9. The apparatus of claim 1, wherein each of the first display device and the second display device comprises one from among a liquid crystal display (LCD) apparatus and an organic light-emitting diode (OLED) apparatus.

10. The apparatus of claim 1, wherein the second display device is disposed in a rear of the light source.

11. The apparatus of claim 6, further comprising a light transmission medium disposed between the light source portion and the LGP.

12. The apparatus of claim 6, wherein the light source portion comprises:
   a first light source portion configured to emit red color light;
   a second light source portion configured to emit green color light; and
   a third light source portion configured to emit blue color light.

13. The apparatus of claim 6, wherein the light source portion is disposed on at least one side surface of the LGP.

14. The apparatus of claim 6, wherein the LGP comprises a diffraction portion which includes a plurality of unit diffraction areas, the plurality of unit diffraction areas correspond to a first plurality of pixels included in a pixel area of the first display device, and the plurality of unit diffraction areas correspond to a second plurality of pixels included in a pixel area of the second display device.

15. The apparatus of claim 14, wherein each of the plurality of unit diffraction areas comprises:
   a first sub-diffraction area;
   a second sub-diffraction area; and
   a third sub-diffraction area,
   wherein each of the first, second, and third sub-diffraction areas comprises grating slits arranged in directions which are different from each other.

16. A three-dimensional (3D) display apparatus, comprising:
   a light source configured to emit light;

a light guide panel configured to receive the emitted light and to diffract the received light such that a first portion of the diffracted light propagates in a first direction to exit through a first side of the light guide panel and a second portion of the diffracted light propagates in a second direction to exit through a second side of the light guide panel which is different from the first side of the light guide panel;

a first display device configured to use the first portion of the diffracted light for formation of a 3D image; and a second display device configured to use the second portion of the diffracted light for formation of the 3D image.

17. The apparatus of claim 16, wherein the first display device is disposed on the first side of the light guide panel and the second display device is disposed on the second side of the light guide panel which is opposite the first side.

18. The apparatus of claim 16, wherein the light guide panel comprises at least one grating.

19. The apparatus of claim 16, wherein the light source comprises a red light source configured to emit a first light that has a first wavelength, a green light source configured to emit a second light that has a second wavelength that is different from the first wavelength, and a blue light source configured to emit a third light that has a third wavelength that is different from the first wavelength and the second wavelength.

20. The apparatus of claim 16, wherein each of the first display device and the second display device comprises one from among a liquid crystal display (LCD) apparatus and an organic light-emitting diode (OLED) apparatus.

21. The apparatus of claim 1, wherein the light source comprises a diffraction grating configured to diffract the light emitted from the light source to simultaneously emit a first light towards the first display device and a second light towards the second display device.

* * * * *